H. KAPFERER.
TRAILER.
APPLICATION. FILED MAY 14, 1921.

1,421,492.

Patented July 4, 1922.
3 SHEETS—SHEET 1.

Inventor
Henry Kapferer,
By Frances Ahleman.
Attorney

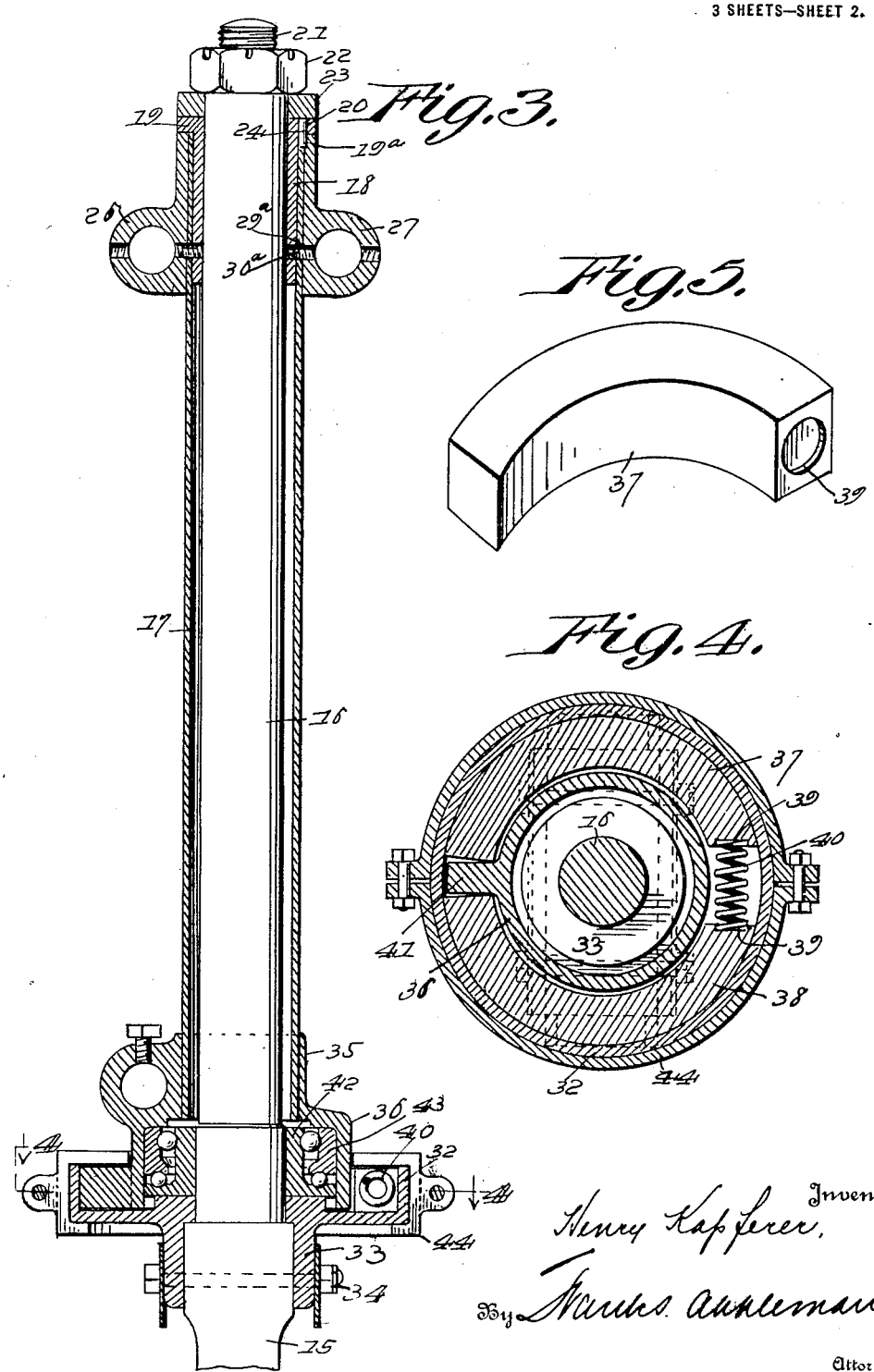

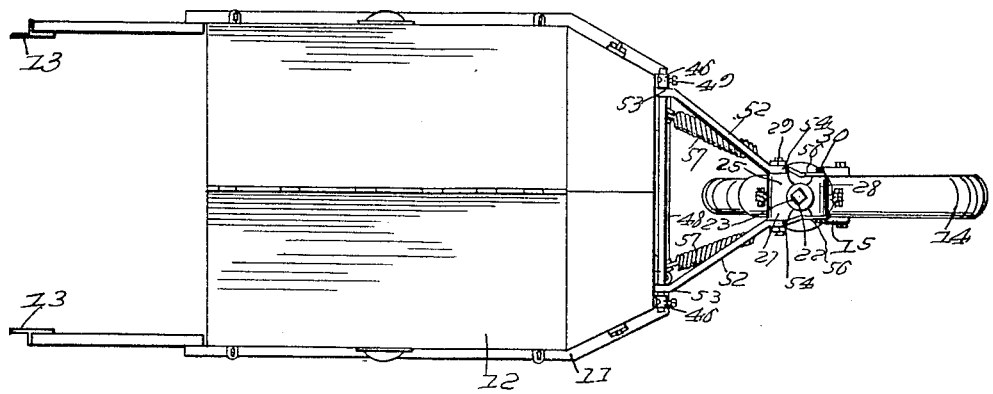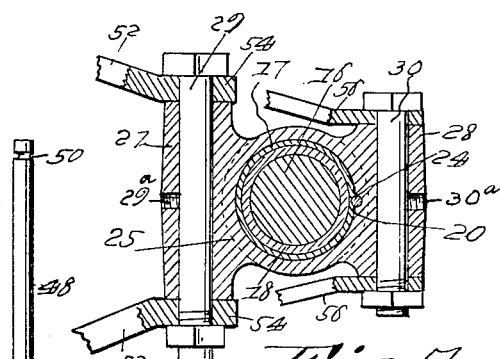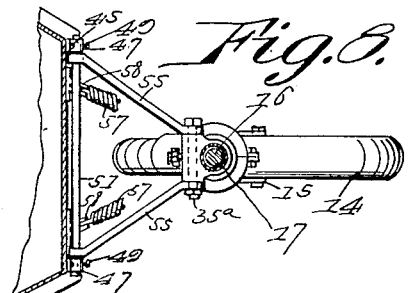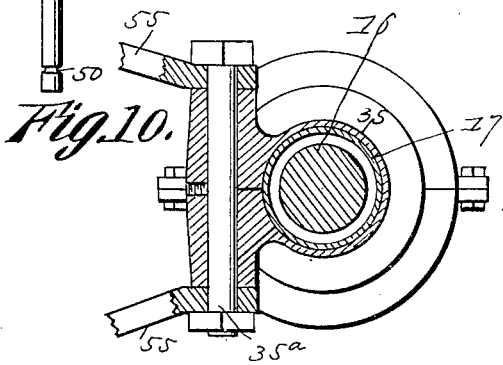

UNITED STATES PATENT OFFICE.

HENRY KAPFERER, OF BILLANCOURT, FRANCE.

TRAILER.

1,421,492.  Specification of Letters Patent.  Patented July 4, 1922.

Application filed May 14, 1921. Serial No. 469,672.

*To all whom it may concern:*

Be it known that I, HENRY KAPFERER, a citizen of the French Republic, and resident of 129 Rue de Bellevue, a Billancourt, Seine, France, have invented certain new and useful Improvements in Trailers, of which the following is a specification.

This invention relates to trailers for vehicles such as automobiles, the said invention having for an object, the provision of novel means whereby the supporting or traction wheel of the trailer has a mounting connected to the frame or body of the trailer, whereby the said mounting may oscillate vertically independently of the movement of the trailer; the said invention also contemplating the provision of means for retaining the parts in normal positions, which normal positions are those in which the trailer frame is supported by the wheel.

It is a further object of this invention to provide means whereby the wheel may move independently of the trailer for the purpose of permitting the wheel to pass over uneven surfaces of a road without communicating the full movement of the wheel and its mounting to the trailer, the purpose being to supply a yieldable connection operating as a suspension for the trailer, so that the said trailer will have movement with respect to the wheel mounting, in order that jars and vibrations incident to the travel of the wheel over the road bed will be absorbed.

It is furthermore an object of this invention to produce a trailer having a wheel mounting in which angular motion of the wheel is frictionally controlled, in order that the wheel may be held in a line of travel, should it leave the road bed as it does when passing over uneven surfaces, in order that when the wheel again contacts the road bed, it will continue to travel in the direction in which it was headed prior to its leaving the road bed. By reason of the provision just indicated, stability of the structure is insured and collapse of the wheel which might result from any sidewise strain, will be avoided.

It is a further object of this invention to provide a trailer of the character indicated in which the load of the trailer will serve as an anchorage for yieldable means connected to the wheel mounting, and operative to retain the wheel on the road bed except where the uneven contours of the road bed are encountered, and at the same time, serve as a suspension of a yieldable character for the trailer.

It is a further object of this invention to produce a trailer having a supporting wheel movable into and out of operative position for the purpose of supporting the trailer while it is being loaded or unloaded, and adapted to be supported out of operative position clear of the road bed when the trailer is being drawn or driven.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 3 illustrates a sectional view of the wheel mounting;

Figure 4 illustrates a sectional view on a line corresponding with the line 4—4 of Fig. 3;

Figure 5 illustrates a perspective view of one of the brake shoes;

Figure 6 illustrates a top plan view of the trailer;

Figure 7 illustrates a sectional view on the line 7—7 of Fig. 1;

Figure 8 illustrates a sectional view on the line 8—8 of Fig. 1;

Figure 9 illustrates a sectional view on the line 9—9 of Fig. 1; and

Figure 10 illustrates a plan view of a connecting rod.

Figure 1:
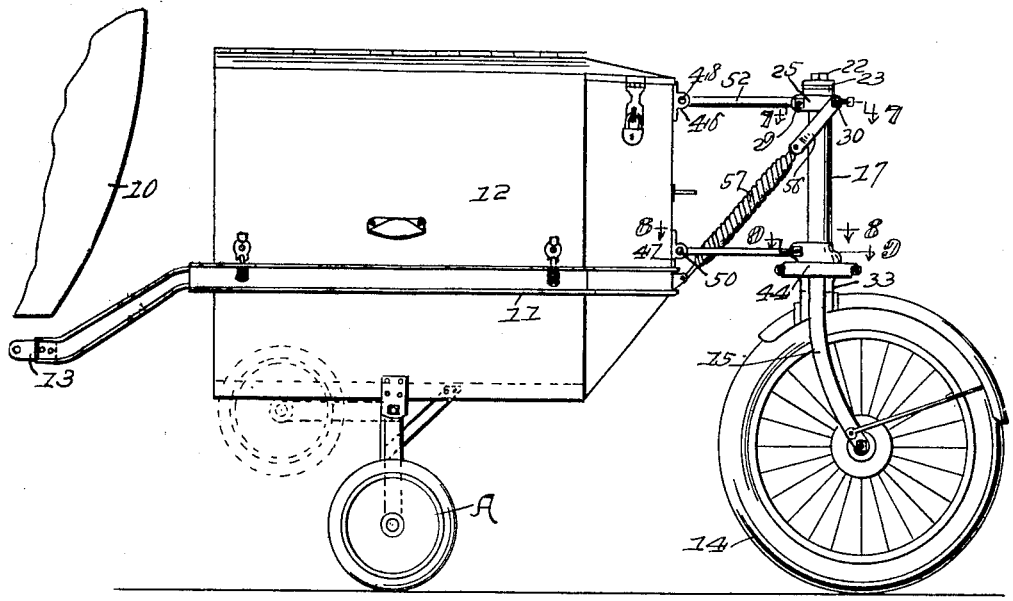
Figure 1 illustrates a view in elevation of a trailer embodying the invention.
Figure 2:
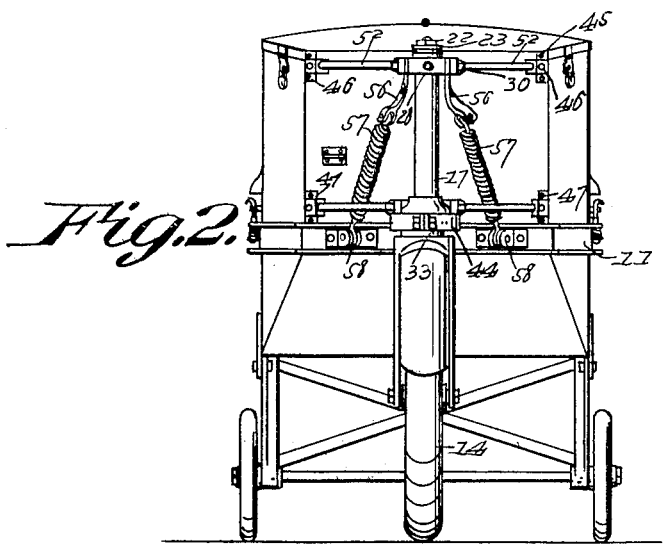
Figure 2 illustrates a front elevation thereof.

In carrying out my invention, I employ a tractor or vehicle, the position of which is indicated by the numeral 10 and I use it as a means for pulling the trailer.

The trailer, in its present embodiment, includes a frame 11 with a body 12 carried thereby, but as the detail construction of the frame and body does not constitute a part of the invention contemplated to be covered by this application, they are not shown or described in detail, in fact, frames of different shapes in plan and bodies of different contours may be employed, and the inventor does not wish to be limited with respect to the construction and manner of assembling these parts of the trailer. It is enough, for an understanding of this invenittion by one skilled in the art, to say that the frame may have some coupling 13, which is here but conventionally shown, it being understood that couplings of known character may be employed.

The traction wheel 14 is here shown as rotatably mounted in a fork 15 which terminates in a shaft 16. The shaft is rotatably mounted in a head including a tubular casing 17. The shaft projects through the tubular casing and is preferably of less diameter than the internal diameter of the said casing. At the upper end of the casing, a sleeve 18 is interposed between the shaft and the casing, and the said shaft has an outwardly extending flange 19 overlying the end of the casing. The said flange has an aperture 20 therein which is in alinement with a recess or seat 19$^a$ in the upper end of the casing. The upper end of the shaft is threaded as shown at 21 to receive a nut 22 which bears against a collar 23 on the shaft. The flange 19 has a pin 24 which extends therethrough and the pin is inserted in the recess 19$^a$ of the casing for securing these parts together.

In the present embodiment of the invention, the upper end of the casing is embraced by a collar comprising the sections 25 and 26, each of which has coinciding apertured lugs 27 and 28. The lugs 27 extend rearwardly and the lugs 28 extend forwardly. The apertures of the lugs 27 have a bolt 29 extending through them and the apertures of the lugs 28 have a bolt 30 extending through them. The head of the fork 15 carries a brake flange or drum 32 by reason of the fact that the said brake flange has a body portion 33 connected to the head of the fork by fastenings 34, such as bolts, and hence, as the shaft 16 rotates and the fork turns with the wheel 14, the brake flange is rotated. There is a coupling 35 at the lower end of the casing, which coupling is stationary with relation to the casing and it is secured thereto. The coupling has an annular flange 36 which extends downwardly into spaced relation with the brake flange 32 and it is concentric therewith. The space between the brake flange 32 and the annular flange 36 contains the brake shoes 37 and 38, each of which has a seat such as 39 in its end, and a spring 40 is interposed between the ends of the brake shoes having the recesses, and the said spring has its ends seated in the recesses. The spring is operative to normally press the brake shoes into engagement with the brake flange. The brake shoes are loosely applied to the channel between the annular flange and the brake flange, and the ends thereof opposite the spring 40 are in spaced relation to each other, and a lug 41 radiating from the annular flange 36 projects between the ends of the two brake shoes and it is operative to exert pressure on one brake shoe or the other, according to the direction of rotation of the fork.

An anti-friction bearing has one of its elements 42 connected to the shaft and its other element 43 carried by the annular flange 36 or by parts associated with it. Since the casing and the annular flange and the lug 41 are stationary, and the shaft and fork and the brake flange move with relation to it, the brake shoes are operative to retard the rotation of the shaft, and this serves to hold the wheel in the line of travel, even though it temporarily disengages the road bed.

A sectional housing 44 embraces the brake flange and parts associated with it, and it serves to retain the brake shoes and their spring as well as other parts, in assembled relation to one another.

On the body of the trailer or some part of the chassis thereof are anchored, as by fastenings 45 such as bolts or rivets, pairs of brackets 46—46 and 47—47, the former of which are near the upper part of the structure and the latter of which are lower down on the structure. The relative positions may, of course, be changed to suit particular requirements, and the inventor does not wish to be limited with respect to these details. A rod 48 extends through the brackets 46-46 and is secured therein by fastenings 49 such as set screws, it being shown that the said rod near its end has circumferential grooves 50 in which the ends of the set screws may be seated.

The brackets 47—47 are likewise supplied with a rod 51 which may be similar to the rod 50 and it may be secured in the same way. Strut rods or braces 52—52 each has angularly disposed apertured ends 53 and 54, the former of which is oscillatably mounted on the rod 48 and the latter of which is attached to the bolt 29. These strut or brace rods 52—52 hold the head in spaced relation to the body or chassis of the trailer, while at the same time allowing relative movement vertically, as will presently appear. The structure preferably includes strut rods 55—55 of the same general construction of those numbered 52 and they are connected to the rod 51 and to the coupling 35 through the medium of a bolt 35$^a$ which holds the coupling 35 on the casing. The coupling 35 is in the nature of a split collar which embraces the casing and has apertured lugs through which the bolt 35$^a$ extends. The strut rods 55 are oscillatably mounted to permit the relative motion of the trailer structure and the wheel head.

The arms 56—56 extend downwardly and slightly inwardly from the bolt 30 on which they are mounted and springs 57—57 are connected to the said arms, the said spring diverging and extending inwardly to the chassis frame to which they are connected by the bracket 58—58. The springs constitute what might be regarded as the suspension of the rearward end of the trailer chassis and body, since by reason of its connection to the head through the strut rods, it may move up and down as the springs yield, and this provision has the effect of retaining the traction wheel on the road bed, although permitting it to rebound therefrom to a degree when it strikes uneven surfaces or obstructions.

The wheel A may be supplied for supporting the trailer if it is disconnected from an automobile, and it is of a foldable type which may be swung up under the body, clear of the road bed when traveling. Any appropriate means of attachment with a chassis frame or body may be employed.

I claim:

1. In a trailer, a chassis, a traction wheel, a head, a mounting for the traction wheel rotatable in the head, means for resisting the rotation of the mounting, oscillatable means for connecting the head to a chassis frame, and springs connecting the said head and chassis frame.

2. In a trailer, a chassis frame, a traction wheel, a mounting in which the traction wheel is rotatable, a head in which the mounting is rotatable, the axle of the traction wheel being offset with relation to the axis of the mounting, means for retarding the rotary motion of the mounting, means oscillatably connected to the chassis and to the head for holding the head in spaced relation to the chassis frame, and means yieldably connecting the said head and chassis frame.

3. In a trailer, a chassis frame, a traction wheel, a mounting in which the traction wheel is rotatably mounted, a head, means for rotatably holding the mounting in the said head, means for retarding the rotation of the mounting in the head, strut rods pivotally connected to the chassis and to the head, and suspension springs connected to the said chassis frame and to the said head on a plane above the plane of their connection to the chassis.

4. In a trailer, a chassis frame, a traction wheel, a mounting in which the traction wheel is rotatably mounted, a head, means for rotatably holding the mounting in the said head, means for retarding the rotation of the mounting in the head, strut rods pivotally connected to the chassis and to the head, suspension springs, means for connecting the said springs to the head, and anchorages for the springs on the chassis frame on each side of the center of said frame whereby the springs diverge from the head to the chassis frame.

5. In a trailer, a chassis frame, a traction wheel, forks in which the wheel is rotatably mounted, a shaft projecting from the forks, bearings in which the shaft is rotatable, means for retarding the movement of the shaft in the said bearings, means for oscillatably connecting the bearings to the chassis frame, and a suspension spring connecting the said chassis frame to the said bearings.

6. In a trailer, a chassis frame, a traction wheel, a fork in which the traction wheel is mounted, a shaft extending upwardly from the fork, a head having bearings in which the shaft is rotatable, means for retarding the rotary movement of the shaft, strut rods pivotally connected to the head and to the chassis frame, and springs diverging from the said head to the chassis frame, means for connecting the springs to the head, and means for connecting the springs to the chassis frame.

7. In a trailer, a chassis frame, a traction wheel, a head therefor, means for rotatably mounting the traction wheel with relation to the head, offset with relation to the axis of the head, means for rotatably holding the mounting in the head, means for resisting the rotation of the mounting, oscillatable means for connecting the head to the chassis frame, and means of suspension connecting the head and chassis frame.

8. In a trailer, a chassis frame, a traction wheel, a head, a mounting for the traction wheel rotatable in the head, the said traction wheel being offset with relation to the axis of the mounting, means for resisting the rotation of the mounting in the head, oscillatable means for connecting the head to the chassis frame and holding it in spaced relation thereto, and a resilient suspension means connecting the head and chassis frame.

9. In a trailer, a chassis frame, a traction wheel, a head having bearings, a mounting rotatable in the said bearings, the traction wheel having bearings in the mounting, offset with the relation to the axis of the mounting, means for retarding the rotation of the mounting, strut rods connecting the head to the chassis frame, and resilient means connecting the head to the chassis frame for suspending the chassis frame.

10. In a trailer, a chassis frame, a traction wheel, a mounting in which the traction wheel is rotatable, a shaft forming a part of the mounting, a head in which the shaft is rotatable, a bearing for the shaft associated with the head, a friction drum carried by the mounting and rotatable therewith, brake shoes within the friction drum, means for holding the brake shoes in the friction drum, and means for urging the brake shoes into engagement with the brake drum.

11. In a trailer, a chassis frame, a traction wheel, a mounting in which the traction wheel is rotatable, a shaft forming a part of the mounting, a head in which the shaft is rotatable, a bearing for the shaft associated with the head, a friction drum carried by the mounting and rotatable therewith, brake shoes within the friction drum, a member carried by the head having a flange extending into the brake drum and having an abutment for the ends of the brake shoes, means for holding the brake shoes in the friction drum, and means for urging the brake shoes into engagement with the brake drum.

HENRY KAPFERER.